Patented Mar. 6, 1934

1,949,722

UNITED STATES PATENT OFFICE 1,949,722

INSECTICIDE

Hugh Knight, Upland, Calif., assignor, by direct and mesne assignments, to Emulsoids, Inc., New York, N. Y., a corporation of Delaware No Drawing. Application May 12, 1930, Serial No. 451,841

2 Claims. (Cl. 167—28)

This invention relates to a thanatoidal preparation or compound for especial use in exterminating phytophagous insects or parasites. It has especial reference to a relatively volatile hydrocarbon possessing a marked lethality for insects without being phytocidal, its volatility being gaged or regulated according to the immersion interval required for producing a lethal effect upon certain types or species of insects, and also according to the period of time the oil film contacts the plant leaf, this period determining the quantity of the oil absorbed into the circulatory system, and hence the susceptibility to injury.

Viscous, non-volatile oils of high saturation, refined from lubricating stocks, and known as "white oils", have been and are being used rather extensively as insecticides on plants in foliage, that is during the active or growing season. These oils, it has been claimed, are non-toxic, chemically inert and phytonomic, that is non-injurious to plants. Extensive research has revealed that these claims of non-injuriousness to plants are contrary to facts and that non-volatile oils, regardless of their saturation point actually do produce serious physiological actions in plants, regardless of their condition of health, because of the absorption by them of an oil, (whose adherence to or presence upon the leaf is prolonged by non-volatility), into the active circulation and the eventual translocation of the absorbed oil to other parts of the plant. It is my belief that in a healthy plant with a normal virile circulation, the mobility of an oil once absorbed by the leaf is very much more rapid than in an unhealthy plant with a sluggish or impaired circulation. In any case, continued metabolic disturbances result by reason of the intrusion of the oil into the tissues of the plant which may and ultimately do become seriously deleterious. Physiological detriments worked in plants by lodgment of oil globules in the tissues manifest themselves in a variety of ways and include dieback, increase in dead wood, insipidity in flavor of fruit and those other evidences which are alluded to in detail in Plant Physiology, vol. 4;299–321— 1929, I have found that the term "phytonomic oils" as indicating oils which are non-injurious to plants is a misnomer. Experiments and microscopical investigations prove conclusively cellular penetration of oil and the translocation of oil into and through the plant tissues. Viscosity of the oil and its volatility are factors of vital consideration in connection with the persistence of the oil upon a leaf and the opportunity offered (by the length of time of such persistence) for the plant to absorb the oil. The absorption of an oil by the leaf occurs almost immediately upon application and the rate of absorption appears to be inversely proportional to the viscosity of the oil used. Absorption of an oil by the leaf or plant is not alone the serious objection offered by its use and to be eliminated. Oils for instance with a high degree of volatility, exhibit a marked increase in lethal effects upon insects, but they also possess the quality of working serious damage to plant tissue, the virulence of the injury being accentuated as the volatility increases. This may be accounted for by the very powerful solvent action of the highly volatile hydrocarbons which may dissolve part of the cell content, such as certain lipoids, gums and essential oils. It is also probable that the very low temperatures caused by evaporation of highly volatile hydrocarbons when in contact with plant tissue may be a factor. In any event plasmolysis of the cell quickly follows the application and death ensues. For these important reasons, it is required that an oil or substance that is suitable as an insecticide, possess the quality of minimum non-injurious persistence upon the plant and of the persistence necessary to kill the insect.

Since certain hydrocarbon oils are, under certain conditions, effective insecticides, but are likewise more or less phytocidal, and since it is desirable to use hydrocarbon oils for the extermination of plant pests, it is of primary importance that such hydrocarbon oils be selected which, though absorbable by the leaf, are nevertheless absorbed in quantities so small that the eventual effect upon the tree or its leaves or branches is practically negligible and but of temporary duration. An oil for this purpose must be potently insecticidal, though not necessarily toxic, that is, it must include the immersion period required to kill the special pest, and at the same time it must possess the quality of minimum persistence upon the leaves, in addition to a minimum quantity in point of thickness of the cuticular oil film to prevent such physiological damage or injury, as reduced or impaired transpiration, clogging of the circulation process in the plant or decrease in the production of carbohydrates, conditions to which excessive leaf drop, fruit drop and other abnormal behavior of the plant, and particularly of the citrus variety, are directly traceable.

The highly refined white oils of high viscosity do not evaporate appreciably at atmospheric temperature and the disappearance of the oil films, which is by no means entire, is owing to the absorption of the oil by the leaf and its entrance into the circulatory system of the plant, where it remains indefinitely, with the results above noted and referred to in Patent #1,707,470 issued to me April 2, 1929.

The object of this invention therefore is to produce an effective parasiticide or insecticide which is practically harmless to plants.

It has been the opinion of entomologists that the lighter and more volatile oils, such as the kerosenes or the kerosene stocks, were not effective insecticides, although they have always been regarded as the least injurious to plants. They were not considered as possessing insecticidal value because of their volatility and dissipation or evaporation from the insects before a lethal effect was produced. Attention was called to this fact in my patent above referred to.

I have discovered that these lighter and more volatile oils may be rendered effective in the extermination of even the most resistant of scale insects, while at the same time, preserving their non-phytocidal characteristics, that is, at least to such a degree that metabolic disturbances in plants do not occur.

If certain insects, for example mealy-bugs, members of the family Coccidæ, be immersed in white oil of high viscosity, (110 seconds Saybolt at 100° F.) and refinement, (100% unsulfonated residue), it will be found that they will remain alive, although completely immersed in the oil, for several days, the average being about seven days. The interval of time elapsing from the moment of immersing the insect till death ensues, I term the "lethal immersion interval". If now, insects of the same species, be immersed in kerosene or unrefined kerosene stocks, the length of time of the immersion necessary to kill the insects is reduced to approximately two hours or less. On this basis, therefore, kerosene is 84 times as lethal to these insects as is the highly refined white oil mentioned. However, when kerosene is sprayed on a plant in the form of an emulsion, its viscosity being less than one third of the white oil mentioned, the amount of kerosene actually deposited as a film upon the insects and plants will be very much less than the amount of white oil deposited under the same conditions, and the volatility of this attenuated film will be very much greater. The duration or persistence of the two oils will vary greatly, though the exact relation is difficult to work out in practice, but it is probably one of minutes, where kerosene is used and of weeks where white oils of high viscosity are used. Therefore the interval of persistence is of indeterminately prolonged duration in the case of white oils, but in the case of kerosene the persistence thereof upon the insect is, owing to its volatility, of too short a duration to effect a kill, the lethal immersion interval not being reached or attained. The great disparity in the lethal effects of the two oils, to wit, white oil and kerosene, is attributable in the opinion of entomologists, to physiological causes in the case of white oils and to chemical action in the case of kerosene, which latter is known to dissolve certain vital constituents in or of the insect, thereby producing death, while the white oils, exercising no chemical effect, penetrate the spiracles and clog the trachea, from which the insect cannot expel the heavy oil, thus killing the insect, presumably by suffocation. Since kerosene or kerosene stocks are as stated 84 times as lethal to insects as the white oil, and practically non-injurious to plants, it is desirable to render these oils capable of exerting their insecticidal properties by including the lethal immersion interval which for any insect is fixed. This I accomplish by extending the interval of persistence sufficiently to effect a kill, without however unduly prolonging the persistence of the oil upon the plant, thereby preventing penetration of the oil, either by absorption or seepage, into the plant organism, to an extent that would ultimately interfere with the metabolism of the plant. By mixing with or dissolving in a kerosene or a kerosene stock a substance of less vapor pressure, (or volatility), than the kerosene, the volatility of the resultant compound or solution may be reduced sufficiently to include, when applied to insects, the lethal immersion interval, the reduction in volatility being gaged according to the resistance of the particular insects that are to be treated. For this purpose, many substances are available and may comprise numerous fats and gums or any of the animal or vegetable oils; the fatty acids derived from these or the alcoholic esters of the fatty acids and they may be used singly or in combination, as desired, it being understood that any substance capable of extending the period of persistence of a volatile hydrocarbon oil for producing a lethal effect upon insects and plant parasites is contemplated and included in this disclosure.

The degree in reduction of volatility of a kerosene is gaged by the quantity of the particular substance added and the immersion interval needed to kill a particular type or species of insect, it being the essential function of these substances to extend the duration of contact or interval of persistence as the volatility is reduced. For this reason it is required that the immersion interval needed to kill any certain species be pre-established, whereupon the kerosene can be prepared with one or more of the substances mentioned and in the necessary proportions to effect a kill. It is of course possible to prepare a solution or compound of a strength sufficient to kill the most highly resistant scale or insects, which compound obviously would then be suitable and effective in exterminating the lesser resistant insects, but because the lethal immersion interval varies with the particular pest, it is desirable to adapt the solution or compound to the pest, and thereby avoid an unnecessary persistence of the oil upon the plant. For instance if stearine be dissolved in kerosene in the ratio of 20% by volume and if this compound be applied at a concentration of 4% as an emulsion, to red scale, it will effect a complete kill of these insects.

A less potent compound is prepared by reducing the amount of the additive substance. For instance, for black and citricola scale in the immature stages, the substance, namely stearine for example, may be reduced to 5% for obtaining a complete kill, the lethal immersion interval for this species of insects being much less than for the red scale which is probably the most resistant and destructive of the insects preying upon certain forms of plant life, notably citrus.

Of considerable importance is the established fact that the oily substance, due to its low viscosity, spreads over the leaf in an extremel; tenuous film, and disappears from the leaf within a relatively short space of time, affording thereby scant opportunity for the leaf to absorb any detrimental proportion of the oil, yet producing the desired lethal effect upon the insect.

The type or character of the oil which I prefer to use is that generally included under the term kerosene. It varies in viscosity from approximately 30 seconds Saybolt to 50 or more, depending upon the cut taken from the still. The degree of unsulfonated residue in oils of high or relatively high volatility and low viscosity is not so important a factor as in oils of high viscosity, such as lubricating oils. In fact, I prefer to use a raw kerosene, that is an unrefined kerosene cut, with a saturation of approximately 70% to 80% unsulfonated residue, because experiments show that the raw kerosene product is more effective in its lethal effect upon the insects, than the highly refined kerosene. Since however, the kerosenes in general, that is, the refined as well as the unrefined or raw, under the conditions set out herein, by which their volatility is reduced to below normal whereby they become effective lethal agents for plant insects, are available, I intend no limitation by expression of the preferential selection herein mentioned.

For use as a spray, which is by far the most efficient mode of application, the compound of kerosene and oil-soluble material, any one or more of which of the groups herein referred to may be used, is emulsified with any emulsifier, though I prefer to use the butyl-acetyl-ricinoleate more particularly described in my co-pending application for patent filed Oct. 28, 1929, Ser. No. 403,128. The compound is applied to the insect at a concentration of approximately 4% by volume in water, but this concentration may vary, depending upon climatic conditions and the insect to be exterminated. It will be found that when this kerosene compound is applied, it will quickly disappear from the foliage, within a relatively short space of time leaving no trace upon the plant and consequently presenting little opportunity for intercullular penetration of the oil and eventual migration into the tissues of the plant. Viscous white oils, on the other hand, persist upon the foliage and plants for indefinite periods, giving an oily and greasy appearance to them which remains for months. The viscous oil films accumulate dust and dirt, which clog the pores and interfere with the normal transpiration and respiration of the plants, in addition to causing serious injury when absorbed into their circulatory system. By the use of the more volatile oils as herein pointed out, the danger of injury to the plants is greatly minimized if not wholly removed, without sacrificing insecticidal efficiency or expedition, I am thus enabled to regulate the immersion in accurate accordance with the interval required to kill the particular species of insect which it is required to exterminate with the least period of persistence of the oil upon the plant.

What I claim, is:

1. As an insecticide for application to plant foliage, a mineral oil having a viscosity of about 30 to 50 seconds Saybolt at 100° F. compounded with an oil soluble ester of a fatty acid derived from an organic oil, said ester being proportioned to prevent a rapid vaporization of the oil and to permit said oil to have a lethal effect on insects before evaporating from said plant foliage.

2. As an insecticide for application to plant foliage, an aqueous emulsion containing a mineral oil having a viscosity of 30 to 50 seconds Saybolt at 100° F. compounded with an emulsifier and with an oil soluble fatty acid ester, said ester being proportioned to regulate the vaporization of the oil and to insure its persistence for a period of time sufficient for lethal action on insects before evaporation from the foliage.

HUGH KNIGHT.